United States Patent
Saliger et al.

(10) Patent No.: US 7,300,716 B2
(45) Date of Patent: Nov. 27, 2007

(54) FUEL CELL SYSTEM WITH A CONTROL UNIT

(75) Inventors: Rainer Saliger, Bamberg (DE); Markus Backes, Esslingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 11/028,369

(22) Filed: Jan. 3, 2005

(65) Prior Publication Data

US 2005/0153181 A1 Jul. 14, 2005

(30) Foreign Application Priority Data

Jan. 9, 2004 (DE) ............... 10 2004 001 424

(51) Int. Cl.
*H01M 8/04* (2006.01)
*H01M 8/12* (2006.01)
*H01M 8/00* (2006.01)

(52) U.S. Cl. .......................... 429/23; 429/13
(58) Field of Classification Search ............ 429/13, 429/23
See application file for complete search history.

(56) References Cited

U.S. PATENT DOCUMENTS

| 2002/0025460 A1* | 2/2002 | Horiguchi et al. ............ 429/13 |
| 2003/0138682 A1* | 7/2003 | Bai et al. ..................... 429/22 |
| 2004/0219399 A1* | 11/2004 | Zhu et al. .................... 429/13 |
| 2005/0048335 A1* | 3/2005 | Fields et al. ................. 429/22 |

\* cited by examiner

*Primary Examiner*—Patrick Joseph Ryan
*Assistant Examiner*—Ben Lewis
(74) *Attorney, Agent, or Firm*—Michael J. Striker

(57) ABSTRACT

Disclosed is a fuel cell system with a control unit (3) for controlling and/or regulating at least one fuel cell unit (1), whereby the fuel cell unit (1) includes at least one membrane monitored by the control unit (3), and an electrical load (4) is provided, in particular an electric drive motor and/or at least one load on the vehicle electrical system, whereby the moistening of the fuel cell membrane is improved. This is achieved according to the present invention by the fact that the control unit (3) includes at least one additional electrical load (5, 7) for an additional power output from the fuel cell unit (1) which is dependent at least on the moistening of the membrane.

10 Claims, 3 Drawing Sheets

FUEL CELL SYSTEM WITH A CONTROL UNIT

CROSS-REFERENCE

The invention described and claimed hereinbelow is also described in DE 102 004 001 424.8, filed Jan. 9, 2004. This German Patent Application, whose subject matter is incorporated here by reference, provides the basis for a claim of priority of invention under 35 U.S.C. 119 (a)-(d).

BACKGROUND OF THE INVENTION

The present invention relates to a fuel cell system with a control unit for controlling and/or regulating at least one fuel cell unit.

Fuel cells are considered to be significant as future drive options and/or electrical power sources for motor vehicles. The type of fuel cell discussed most often is the "polymer electrolyte membrane fuel cell" (PEM fuel cell), which functions at temperatures below 100° Celsius. Other types of fuel cells are also common.

For example, current flow in PEM fuel cells is related to adequate moistening of the membrane. If moistening is inadequate due to unfavorable operating conditions, resistances in the cell invariably increase and, if this condition persists, the cell can be destroyed. Maintaining adequate moisture in all operating states is essential to the effective and safe operation of fuel cells.

SUMMARY OF THE INVENTION

The object of the present invention is to propose a fuel cell system with a fuel cell unit with which the moistening of the fuel cell membrane is improved.

Accordingly, a fuel cell system according to the present invention is distinguished by the fact that the control unit includes at least one additional electrical load for an additional power withdrawal and/or power output from the fuel cell unit, the additional power withdrawal or power output being a function of the moistening of the membrane, at the least. The core of the idea according to the present invention is to utilize, in an elegant manner, the knowledge that the water being produced in the fuel cell by the corresponding electrochemical reaction of the educts is influenced by or dependent on the actual power output or power withdrawal. Advantageously, the operating point of the fuel cell unit is capable of being shifted with the aid of the additional electrical load according to the present invention, enabling the hydration status of the membrane to be maintained in an advantageous manner.

In general, the moistening of the fuel cell membrane can also be influenced by the educts flowing into the fuel cell. This can be provided in combination with the use—according to the present invention—of the additional electrical load, for example. Changing the degree of the moistening of the membrane with the aid of the additional electrical load according to the present invention is decisively faster and more effective than influencing the degree of moistening of the membrane by changing the water supply. This is an extraordinary advantage, particularly in the case of highly dynamic changes and/or demands on the fuel cell unit, which is the case with vehicle applications or the like.

Advantageously, if the moistening of the fuel cell membrane is inadequate, then, according to the present invention, the fuel cell unit is operated with the aid of the additional electrical load with comparatively high electrical power and/or current densities. Due to the relationship of fuel cell voltage to current density, the increase in power density is realized primarily by withdrawing a comparatively high current. This means that the operating point of the fuel cell unit is changed primarily by shifting and/or increasing the current density of the fuel cell unit.

For example, when it is determined that the degree of hydration of the membrane is relatively poor, e.g., via cell monitoring, impedance measurement or the like, the water content of the membrane is improved by withdrawing an increased electrical current from the fuel cell unit, possibly for a short period of time, so that a greater amount of water is therefore advantageously formed internally.

In this case, the corresponding media flows of the educts and/or products of the increased load demand are advantageously adjusted with the aid of the control unit, among other things. This adjustment is relatively easy to realize, however.

The additional load withdrawn from the fuel cell unit may be consumed and/or converted substantially directly by the additional electrical load. For example, the power output can be converted directly into heat energy and/or another form of energy. This heat energy may be used to heat individual components of the fuel cell system and/or to heat the vehicle passenger compartment or the like.

It is also feasible, mainly in the case in which the total system does not require any heat energy, that the heat energy is released to the surroundings with the aid of an advantageous cooling device or the like.

Advantageously, intermediate storage of the additional power withdrawn from the fuel cell unit is provided. For example, the additional load comprises at least one intermediate storage device for intermediately storing the additional power withdrawn from the fuel cell unit. It can be a thermal intermediate storage device and/or an electrical intermediate storage device for intermediately storing electrical energy. With the latter variant of the present invention, the intermediate storage device is advantageously designed as a rechargeable electric battery, an electric battery and/or an electric capacitor unit, in particular as a "supercapacitor" unit. Intermediate storage devices that are already available commercially can be advantageously utilized, which can result in an economically particularly favorable realization of the fuel cell system according to the present invention in particular.

In an advantageous embodiment of the invention, the control unit includes at least one electrical converter device for changing the power withdrawal from the fuel cell unit. With the aid of this measure, an advantageous change in power withdrawal can be implemented as a function of the required and/or variable water production on the membrane. For example, a variable, increased current can flow in the fuel cell stack for the duration of activation of the additional electrical load. In this manner, the degree of hydration can be advantageously adjusted to the most diverse operating states.

In a particular further development of the present invention, the converter device is designed as a DC/DC converter. With the aid of a corresponding DC/DC converter, the decrease in different outputs is achievable in an advantageous manner, for example, by varying the pulse width and/or period duration of the corresponding signal. The term used generally in technical circles in the former case is pulse-width modulation (PWM) and, in the latter case, the term is frequency modulation (FM). In both cases, the "varying" is carried out to change the mean—and effective—value of the corresponding signal, which is used according to the present invention to change the power output from the fuel cell unit. It may be possible to use DC/DC converters that are already commercially available, which would enable an economically particularly favorable realization of the present invention.

As an alternative, or in combination with aforementioned variants with a DC/DC converter, the additional load can include at least one electrical resistor. For example, a corresponding resistor can be triggered with the aid of an advantageous electric switch capable of being triggered by the control unit in particular. It may be possible to use an electrical resistor which is capable of being changed in a controlled manner. These are embodiments of the present invention with particularly simple designs for withdrawing greater output and/or greater current from the fuel cell unit.

In general, it must be noted that, according to the present invention, power is withdrawn from the fuel cell unit with the aid of the additional electrical load which is generally greater than the power actually required in the particular operating state of the system.

The excess additional power produced by the fuel cell unit is preferably utilized in the system in a practical manner. For example, this electrical power and/or energy is placed in intermediate storage using advantageous devices. By utilizing intermediate storage, additional energy can be advantageously released and/or used in particular operating states of the total system, in particular during peak load requirements or the like, enabling the realization of an advantageous, possibly smaller sizing of individual components of the system. As a result, peak load requirements on the fuel cell unit in particular can be buffered in a correspondingly advantageous manner.

At least one supply line for supplying the intermediately-stored energy to the load is advantageously located between the electrical load and the intermediate storage device. With this, the intermediately-stored energy of the electrical load is particularly easy to supply in certain operating states with relatively high load demand.

DETAILED DESCRIPTION OF THE PREFERRED EMBODIMENTS

Figure 1:
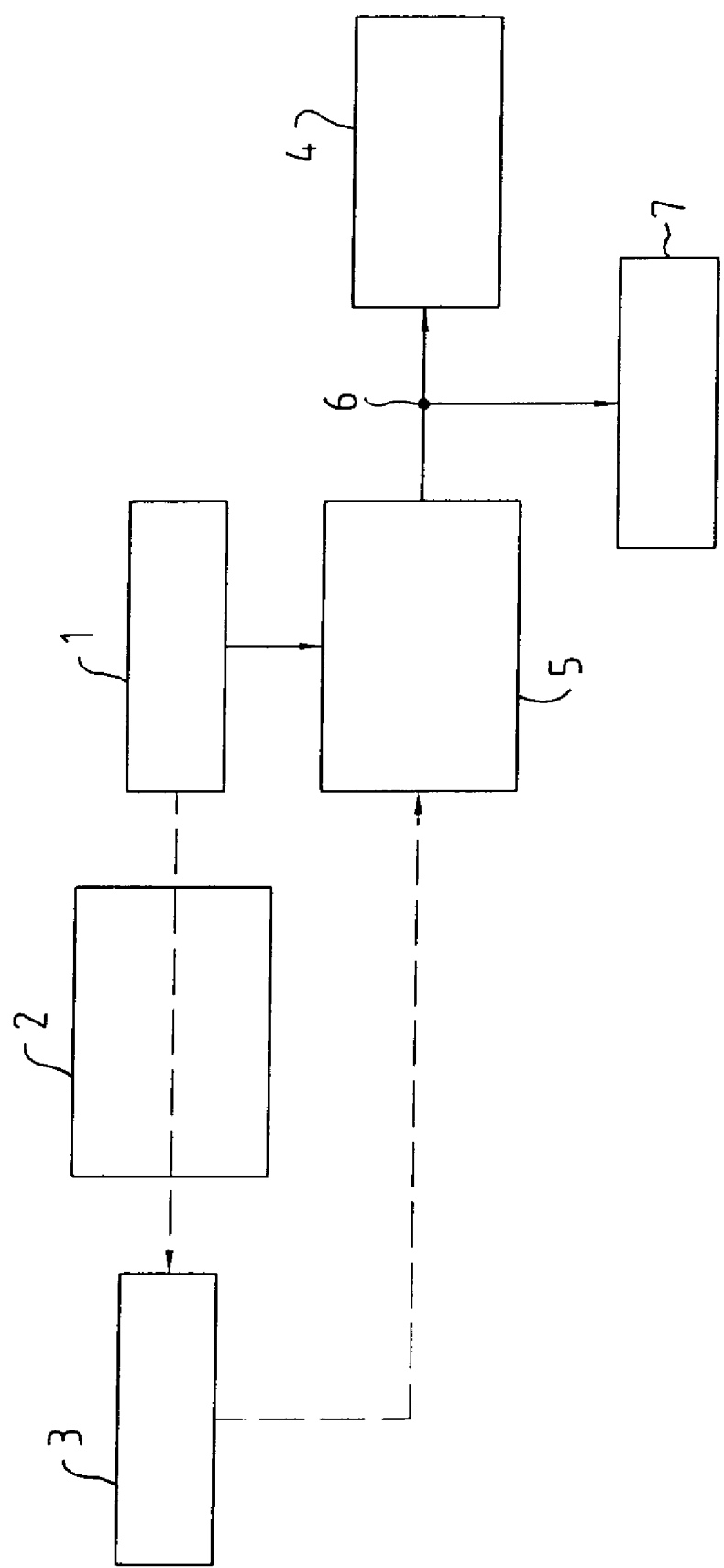
FIG. 1 shows a schematic block diagram of a first variant of the present invention.
Figure 2:
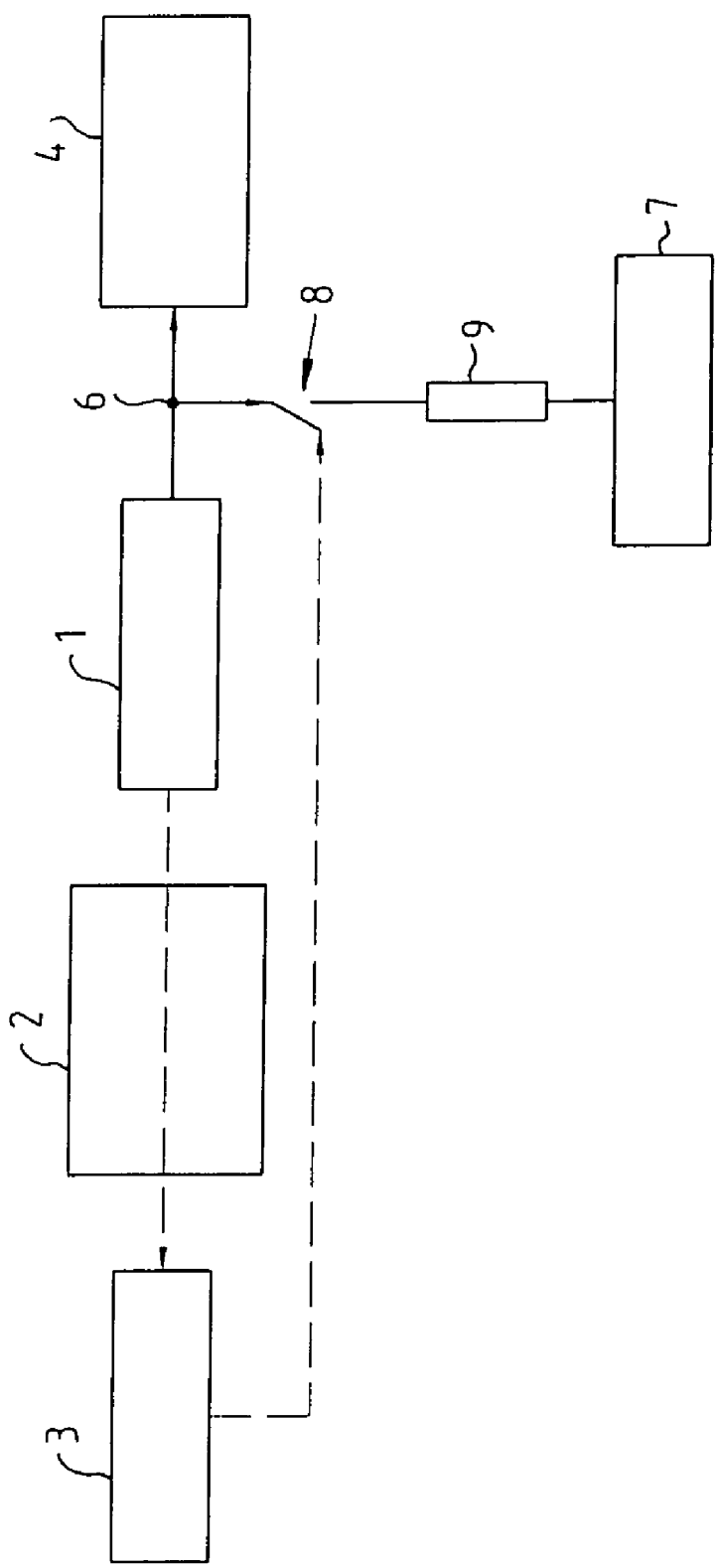
FIG. 2 shows a schematic block diagram of a second variant of the present invention.

FIGS. 1 and 2 are both schematic sections of a fuel cell system shown in block diagrams. A fuel cell 1 is monitored by a monitoring unit 2. Monitoring unit 2, in particular an impedance spectroscopy system, a diagnostic unit, which functions according to the state-of-function principle, for example, or the like, transmits to control unit 3 the state of fuel cell 1 and/or advantageous parameters of fuel cell 1, such as the degree of hydration of a membrane of fuel cell unit 1. The state of the absence of water in fuel cell 1 can be sensed at selected load states, among other things, by comparing stored characteristic curves or determining the high-frequency resistance, for example. Highly diverse methods and strategies for this are already known according to the related art.

In the first variant of the present invention according to FIG. 1, fuel cell 1 transfers its power to an electrical load 4 via a DC/DC converter 5. Via a branch 6, which is located between fuel cell 1 and DC/DC converter 5 and electrical load 4, fuel cell 1 is also connected to a battery 7.

A second variant of the present invention is shown in FIG. 2, whereby fuel cell 1 is connected via branch 6 and a triggerable switch 8 and an electrical resistor 9 to battery 7.

According to FIG. 1, control unit 3 is connected with DC/DC converter 5 and, according to FIG. 2, it is connected with switch 8 such that these three can influence and/or control corresponding components 5, 8.

Figure 3:
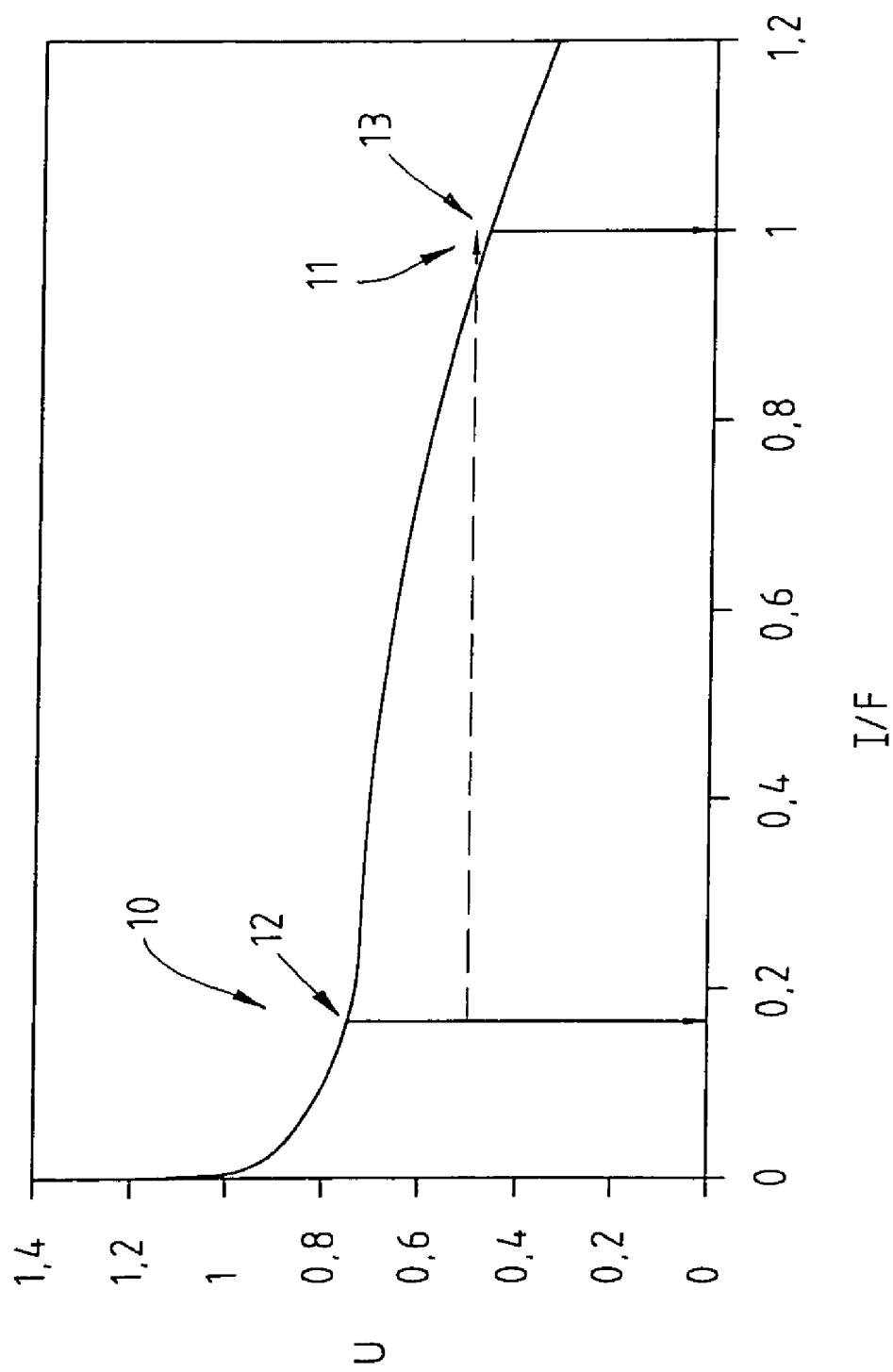
FIG. 3 shows a schematic current density-voltage characteristic curve of a fuel cell unit.

A diagram is shown schematically in FIG. 3, whereby voltage U from fuel cell 1 is shown as a function of an electric current density $[A/cm^{-2}]$ (current per unit area). A first operating point 12 of fuel cell 1 is located in a range 10, in which a relatively small amount of water is produced internally. A second operating point 13 is located in a second region 11, in which a relatively large amount of water is produced internally. The present invention takes advantage—in an elegant manner, with the aid of the additional load—of the fact that the internal water production of fuel cell 1 can be markedly increased briefly, e.g., by shifting the operating point from point 12 to point 13. This results in a particularly rapid and thorough moistening of the membrane.

The increase in internal water production of fuel cell 1 takes place in the variant according to FIG. 1 such that the control unit triggers DC/DC converter 5 such that it increases the power withdrawal from fuel cell 1. This takes place, for example, by changing the pulse width and/or period duration of the electrical parameter. In other words, via "pulse-width modulation" (PWM) and "frequency modulation" (FM). The excess, outflowing electrical power that is not required by electrical load 4 is forwarded according to FIG. 1 to battery 7 for intermediate storage.

In accordance with the variant according to FIG. 1, it is provided in the variant according to FIG. 2 that control unit 3 can close switch 8, so that electric current and/or power is supplied via resistor 9 to battery 7. According to the present invention, this results in increased power withdrawal from fuel cell 1.

In the variants mentioned above, the electric power flowing out of fuel cell 1, e.g., at operating point 13, is greater than the power actually required in the particular operating state, e.g., operating point 12, of the system. The problem, namely that the membrane can partially dry out and/or that an inadequate degree of hydration of the membrane can occur, is possible during sustained minimal-load or part-load operation, which is symbolized by operating point 12.

In general, an advantageous water content of fuel cell unit 1 can be guaranteed according to the present invention for any operating state and/or operating mode.

A fuel cell system according to the present invention can be used basically for any type of vehicle, in particular for passenger or commercial vehicles, and for stationary systems such as power stations or the like.

The invention claimed is:

1. A fuel cell system with a control unit (3) for controlling and/or regulating at least one fuel cell unit (1), whereby the fuel cell unit (1) includes at least one membrane monitored by the control unit (3), and an electrical load (4) is provided, selected from the group consisting of an electric drive motor, at least one load of a vehicle electrical system, and both, wherein the control unit (3) includes at least one additional electrical load (5, 7, 9) connected with the fuel cell unit (1) for an additional withdrawal from the fuel cell unit (1) by the at least one additional electrical load (5, 7, 9) of power to be used, which additional power withdrawal is dependent at least on the moistening of the membrane, wherein an increased electrical current is withdrawn from the fuel cell unit by the at least one additional electrical load (5, 7, 9) when it is determined that the degree of hydration of the membrane is relatively poor.

2. The fuel cell system as recited in claim 1, wherein the additional load (5, 7, 9) includes at least one intermediate storage device (7) for intermediate storage of the additional power withdrawn from the fuel cell unit (1).

3. The fuel cell system as recited in claim 1, wherein the intermediate storage device (7) is designed as an electrical rechargeable battery (7), an electrical battery (7) and/or a capacitor unit.

4. The fuel cell system as recited in claim 1, wherein the control unit (3) includes at least one electrical converter device (5, 9) for changing the power withdrawal from the fuel cell unit.

5. The fuel cell system as recited in claim 1, wherein the converter device (5, 9) is designed as a DC/DC converter (5).

6. The fuel cell system as recited in claim 1, wherein the additional load (5, 7, 9) includes at least one electrical resistor (9).

7. The fuel cell system as recited in claim 1, wherein at least one supply line (6) is located between the electrical load (4) and the intermediate storage device (7) for supplying the intermediately-stored energy to the load (4).

8. The fuel cell system as recited in claim 1, wherein the control unit (3) is designed such that the supply of intermediately-stored energy from the intermediate storage device (7) to the load (4) takes place as a function of the moistening of the membrane.

9. A vehicle, in particular a passenger vehicle or a commercial vehicle, having a fuel cell system, wherein the fuel cell system is configured according to one of the preceding claims.

10. An energy center, in particular an energy-based cogenerator, with a fuel cell system, wherein the fuel cell system is configured according to one of the preceding claims.

* * * * *